(12) United States Patent
Guggenberger et al.

(10) Patent No.: US 11,021,328 B2
(45) Date of Patent: Jun. 1, 2021

(54) PACKAGING MACHINE WITH TRANSPORT CHAIN

(71) Applicant: Multivac Sepp Haggenmüller SE & Co. KG, Wolfertschwenden (DE)

(72) Inventors: Tobias Guggenberger, Memmingen (DE); Peter Kovacs, Memmingen (DE); Robert Maier, Babenhausen (DE); Konrad Mößnang, Kempten (DE); Christian Lau, Heimenkirch (DE)

(73) Assignee: MULTIVAC SEPP HAGGENMUELLER SE & CO. KG, Wolfertschwenden (DE)

( * ) Notice: Subject to any disclaimer, the term of this patent is extended or adjusted under 35 U.S.C. 154(b) by 0 days.

(21) Appl. No.: 16/663,816

(22) Filed: Oct. 25, 2019

(65) Prior Publication Data

US 2020/0130944 A1  Apr. 30, 2020

(30) Foreign Application Priority Data

Oct. 26, 2018 (DE) .................... 10 2018 218 384.8

(51) Int. Cl.
*B65G 17/40* (2006.01)
*B31B 70/04* (2017.01)
(Continued)

(52) U.S. Cl.
CPC .............. *B65G 17/40* (2013.01); *B31B 70/04* (2017.08); *B65G 17/06* (2013.01); *B65G 17/48* (2013.01);
(Continued)

(58) Field of Classification Search
CPC ........ B65G 17/40; B65G 17/06; B65G 17/48; B65G 47/91; B65G 17/32; B65G 17/002;
(Continued)

(56) References Cited

U.S. PATENT DOCUMENTS 3,204,756 A * 9/1965 Lesch ..................... B65B 41/04
198/465.1
4,459,093 A 7/1984 Asano
(Continued)

FOREIGN PATENT DOCUMENTS

DE  2355921 A1  5/1975
DE  10326727 B3  8/2004
(Continued)

*Primary Examiner* — James R Bidwell
(74) *Attorney, Agent, or Firm* — Brooks Kushman P.C.

(57) ABSTRACT

A packaging machine having several work stations, a transport chain and a chain deflection pulley on which the transport chain is mounted. The transport chain comprises chain clips, each chain clip having an upper part and a lower part, wherein the upper part and/or the lower part may be moveable relative to each other to move the chain clips between an open position and a closed position. The material blank may be introduced into the open chain clips and secured in the closed chain clips to transport the material blank in a direction of transport using the transport chain. A chain opening mechanism may be actively and operably changed between an opening state and a closing state in
(Continued)

order to open and close at least one chain clip disposed on a planar oriented section of the transport chain and/or to maintain an already opened chain clip in an open state.

17 Claims, 6 Drawing Sheets

(51) Int. Cl.
    *B65G 17/06*         (2006.01)
    *B65G 17/48*         (2006.01)
    *B65G 47/91*         (2006.01)

(52) U.S. Cl.
    CPC ...... *B65G 47/91* (2013.01); *B65G 2203/0225* (2013.01); *B65G 2203/042* (2013.01); *B65G 2249/04* (2013.01)

(58) Field of Classification Search
    CPC .. B65G 17/005; B65G 17/323; B65G 17/326; B65G 2203/0225; B65G 2203/042; B65G 2249/04; B31B 70/04; B31B 70/10; B65H 20/16; B65H 2801/81; B65H 2301/44338; B65H 5/08; B65H 5/36; B65H 5/02; B65H 7/14; B65B 41/04; B65B 5/06
    USPC ................. 198/867.05, 867.07, 803.7, 803.9
    See application file for complete search history.

(56) References Cited

U.S. PATENT DOCUMENTS

| | | | | |
|---|---|---|---|---|
| 4,779,717 A * | 10/1988 | Eberle | .................. | B65H 29/003 101/408 |
| 4,905,986 A * | 3/1990 | Muller | .................. | B65H 29/003 198/803.9 |
| 5,311,976 A * | 5/1994 | Backman | ............. | B65G 17/323 198/349.1 |
| 5,348,285 A * | 9/1994 | Huser | .................... | B26D 7/018 271/183 |
| 5,380,000 A * | 1/1995 | Ohno | .................. | B65H 29/003 101/410 |
| 6,286,662 B1 * | 9/2001 | Meier | .................. | B65H 29/003 198/803.9 |
| 7,398,875 B2 * | 7/2008 | Niesar | .................... | B65B 41/14 198/803.7 |
| 9,051,125 B2 * | 6/2015 | Kurz | ........................ | B65B 41/14 |
| 2012/0035033 A1 | 2/2012 | Draghetti | | |

FOREIGN PATENT DOCUMENTS

| | | |
|---|---|---|
| DE | 102006006523 A1 | 8/2007 |
| EP | 126878 A1 | 12/1984 |
| JP | 02052703 U | 4/1990 |

* cited by examiner

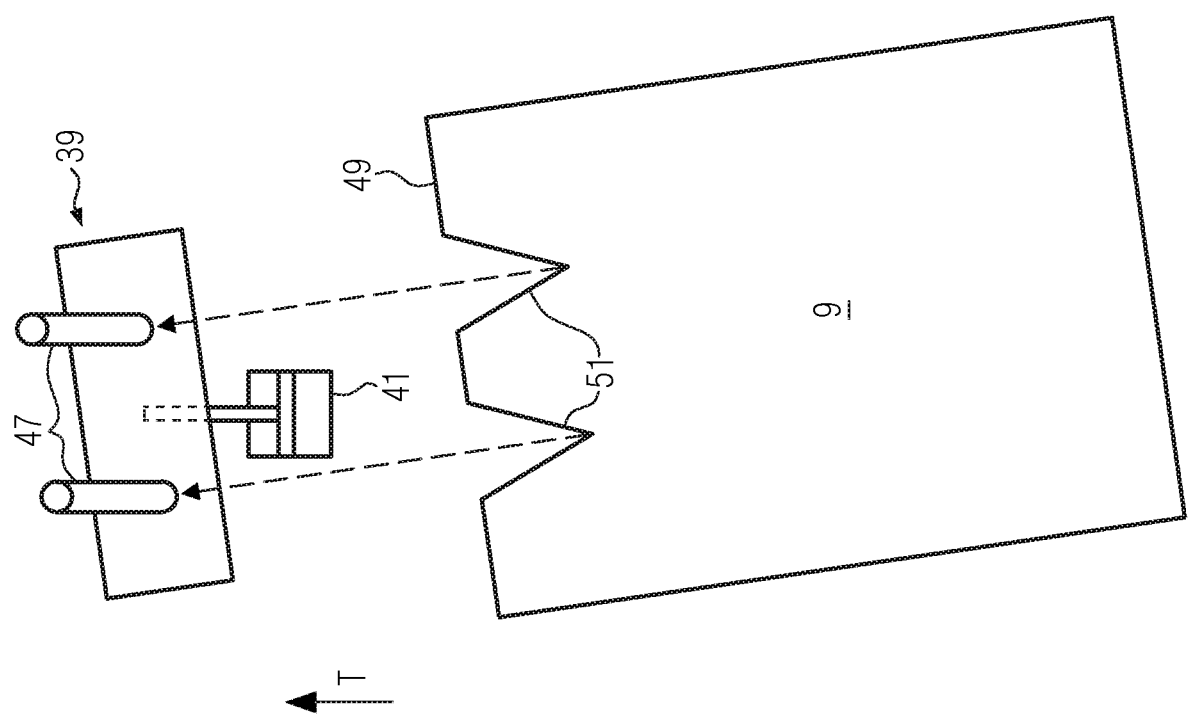

PACKAGING MACHINE WITH TRANSPORT CHAIN

CROSS-REFERENCE TO RELATED APPLICATIONS

This Application claims priority to German Patent Application No. 10 2018 218 384.8 filed on Oct. 26, 2018 to Tobias Guggenberger, Peter Kovacs, Robert Maier, Konrad Mößnang and Christian Lau, currently pending, the entire disclosure of which is incorporated herein by reference.

FIELD OF THE INVENTION

The present invention relates to a packaging machine with a transport chain for transporting a material blank as well as a method for operating the packaging machine.

BACKGROUND OF THE INVENTION

In addition to work stations for filling and subsequently sealing packagings, packaging machines, in particular for food products, typically also comprise work stations for forming the packaging itself from a primary material supplied. For example, packaging trays, into which a food product is subsequently inserted, are formed from a suitable base film by thermo-forming and sealed airtight with a top film. The base film is usually a plastic material which is continuously fed from a dispenser roll in the form of a continuous web. As the use of alternative packaging materials becomes increasingly relevant to raise environmental sustainability and recyclability, packaging machines must also be adapted for use with these materials. When using, for example, coated cardboard as the starting material for flat packaging bases, however, it cannot be fed from a dispenser roll to the packaging machine, but is usually given in the form of a stack or a row of flat material blanks. It would also be advantageous to design the packaging machine such that the use of different starting materials is possible.

SUMMARY OF THE INVENTION

The object of the present invention is to provide a packaging machine with a transport system for packaging material, where the packaging machine may be adapted to process packaging material in the form of flat material blanks as multiple product supports or packaging base members. In the case of multiple product supports, several regions of every material blank can be filled with products, sealed and then separated into several packagings.

The object is satisfied according to the invention with a packaging machine according to the present disclosure and a method for operating a packaging machine according to the present disclosure.

A packaging machine according to the invention comprises several work stations, for example, a sealing station and a cutting station, and a transport chain for transporting a flat material blank to the work stations, where the material blank may be the primary material for the packaging. Furthermore, the packaging machine comprises a chain deflection pulley on which the transport chain may be mounted, where the transport chain in turn comprises chain clips, each having an upper and a lower part, of which the upper part and/or the lower part may be pivotable and/or slideable for opening and closing the chain clips. The material blank can be introduced into the open chain clips and secured in the closed chain clips, so that the material blank can be moved by way of the transport chain along a direction of transport, preferably intermittently. The packaging machine may comprise a chain opening mechanism configured to actively operably change from an opening state to a closing state and vice versa in order to reversibly open at least one chain clip of a planar oriented section of the transport chain and/or to maintain an already opened chain clip open so that the material blank can be introduced into the chain clip. The planar oriented section of the transport chain may be at least substantially horizontal, i.e. may be aligned within an angular range of −15° to +15° relative to the horizontal. A flat material blank can then be fed in the transport plane to the transport chain and, secured in one or more chain clips, be transported by the transport chain for processing. No kinking or bending of the material blank occurs and respective possibly permanent material impairments, such as kinks or bent surfaces, are prevented. Accordingly, correct operation of the sealing process in the sealing station and a perfect appearance of the packaging are ensured. In order to ensure reliable transport of the material blank, it can also be expedient to arrange a transport chain along the direction of transport on both sides along the lateral edges of the packaging machine. The material blank may be then secured symmetrically respectively in a right and a left chain clip. "Transport chain" within the meaning of the invention may be generally to be understood as a continuous transport device and can also comprise, for example, a transport belt.

The chain opening mechanism may be preferably configured to reversibly open a chain clip in a section downstream of the chain deflection pulley. This section, which can be defined as the beginning with an upper vertex of the chain deflection pulley, provides the earliest possibility of introducing the flat material blank preferably horizontally into the open chain clip in order to subsequently secure the material blank by closing the chain clip. Accordingly, feeding the material blanks may be most efficient.

In an advantageous variant, the chain deflection pulley may comprise a run-on contour which may be configured to reversibly open one chain clip which may be disposed along a section of the chain deflection pulley. The chain clips which are still upstream of the planar section of the chain opening mechanism can be then already opened.

In a further variant, the run-on contour may be arranged such that the chain clip may be opened along a section in the region of an upper half of the chain deflection pulley, or that the run-on contour may be adjustable in order to adjust the section along said chain deflection pulley in which the chain clip may be opened. In the upper half of the chain deflection pulley, the chain clips usually run from below along a circumference toward the top vertex and in the closed state would obstruct the feeding process of the material blank. Due to the fact that the chain clips are already open when they arrive in the region of the advance path of the material blank, the latter can be moved freely through the open chain clips. By suitable arrangement of a dispenser roll, plastic material in the form of a film web can also be supplied to the transport chains in that the film web may be threaded into the chain clips in said upper half of the chain deflection pulley. If the run-on contour may be adjustable, then the film web can optionally also be threaded in at an angle from below in the region of the chain deflection pulley, and the dispenser roll can be arranged accordingly. In both variants, the packaging machine may be therefore suitable for processing both flat material blanks as well as continuous plastic film webs or fiber material webs.

The packaging machine advantageously may comprise an advancing device which may be configured to push a material blank into the open chain clip. The advancing device can be configured, for example, as a conveyor belt or as a pusher in the form of a pneumatically driven piston arrangement. The flat material blanks can then be fed to the transport chain in synchronism with the work cycle of the work stations and consequently the transport chain, and therefore without additional time per work cycle being required.

The packaging machine preferably may comprise a support on which the material blank can be deposited by a destacker, where the support may be aligned with the open chain clip in such a way that the material blank can be pushed into the chain clip by the advancing device. A stack of material blanks can then be separated and the individual material blank, which may be then disposed on the support at the height of the open chain clip, only needs to be pushed with a linear motion in the direction of transport into the chain clip. A feed mechanism, easy to design and adaptable to the cycle of the work station, may be thus provided to which the primary material in stacks can be made available in stacks.

In a common variant, the packaging machine may comprise a lateral guide element and/or a pusher which are configured to align the material blank transverse to the direction of transport. This ensures that the material blank may be aligned as desired parallel to the direction of transport and may be secured correctly aligned by the chain clip. The material blank does not touch any other structures of the packaging machine during the transport to the work station and may be not damaged or displaced, which would otherwise impair further use in the work station.

In one preferred variant, the packaging machine may comprise an adjustable stop, in particular one that may be variably positionable along the direction of transport, in order to align the material blank along the direction of transport. The stop therefore also ensures the position of the material blank in the direction of transport, so that the material blank may be correctly placed in the work station after the transport chain has been advanced.

The stop ideally may comprise at least one, preferably two or more centering contours. Such a centering contour can be, for example, a vertically arranged pin which engages with a recess on a front edge of the material blank. Two cylindrical pins can preferably be arranged as a stop, which respectively engage with a triangular recess of the material blank, whereby the latter may be aligned both transverse as well as longitudinally relative to the direction of transport. This may be a way to align the material blank which may be particularly easy to implement and makes it possible to dispense with lateral guide elements.

The stop may be advantageously movable, in particular pivotable or vertically movable, to be extended into and retracted from the transport path of the material blank. After successful alignment of the material blank, its further transport may be thus enabled.

In one further preferred variant, the stop may be coupled to the chain opening mechanism. The motions of both components are then synchronous and it may be possible to provide only a single common drive, such as an electric motor.

In one common variant, the packaging machine may comprise one or more sensors which are configured to detect the position and orientation of the material blank. For example, the advancing device and lateral pushers can be controlled according to the data obtained to correctly position the material blank. The end position can likewise be detected prior to the onward transport of the material blank and, if this does not meet the specifications, a corresponding warning can be issued, processing the material blank in the work station can be skipped or the material blank can be sorted out. A feedback and readjustment system may be provided.

In one further expedient variant, the packaging machine may comprise a suction gripper which may be configured to place the material blank into the open chain clip. With a suction gripper, it may be, for example, possible to take the material blanks directly from the top of a stack, whereby a destacker can be dispensed with. With chain clips, which are opened by laterally opening the upper part, the material blank can be placed therein from above by the suction gripper, this allowing for precise positioning. However, a push-in process parallel to the direction of transport is also possible.

The chain opening mechanism can typically be selectively deactivated. This may be advantageous, for example, when the packaging machine, instead of the flat material blanks, processes a continuous plastic film web which in the region of the chain deflection pulley may be threaded into the transport clips which are opened by way of the run-on contour. It makes sense to close the chain clips again at the latest when leaving the chain deflection pulley at the top apex in order to reliably secure the plastic film web.

An material blank according to the invention, in particular made of cardboard or fiber composite material may be suitable as a multiple product support or as a packaging base, where the material blank may be a sheet-like element, in particular having a rectangular shape. At a front edge, the material blank may comprise at least two centering recesses which are suitable for bearing against a stop of a packaging machine, so that the material blank may be aligned longitudinally and transverse relative to a direction of transport of the packaging machine. The material blank can then be processed in the work station as intended, and further guide elements for alignment can be dispensed with.

A method according to the invention for operating a packaging machine may comprise the following method steps:

actively actuation of a chain opening mechanism which thereby changes from a closing state to an opening state which causes at least one of several chain clips, arranged on a transport chain and disposed in a planar oriented section of the transport chain, to open or remain open introducing a flat material blank into the at least one open chain clip, closing the chain clip, transporting the material blank to a work station.

The introduction of the flat material blank into the at least one open chain clip preferably takes place in that the material blank may be pushed by an advancing device into the chain clip and/or may be placed by a suction gripper into the chain clip. Other aspects and advantages of the present invention will be apparent from the following detailed description of the preferred embodiments and the accompanying drawing figures.

DESCRIPTION OF THE SEVERAL VIEWS OF THE DRAWING

In the following, an advantageous embodiment of the present invention will be explained in more detail making reference to a drawing, in which the individual figures show:

FIG. 6 is a schematic view of one embodiment of a packaging machine in accordance with the teachings of the present disclosure showing one embodiment of a material blank and a stop.

DETAILED DESCRIPTION OF THE INVENTION

Figure 1:
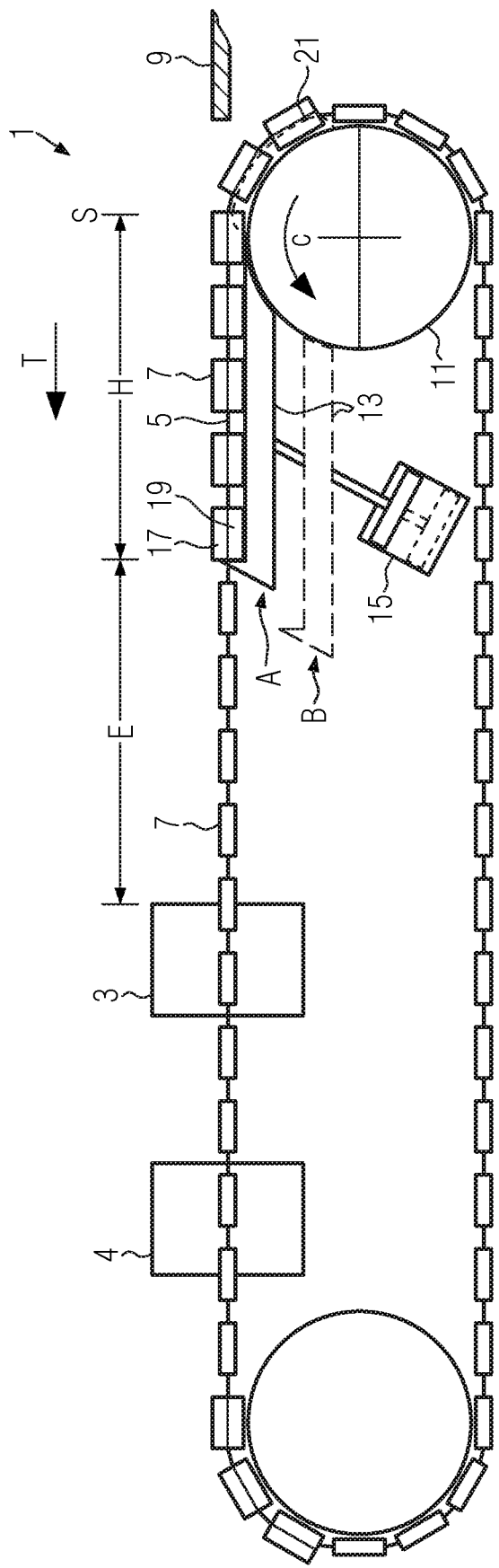
FIG. 1 is a schematic view of one embodiment of a packaging machine in accordance with the teachings of the present disclosure.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1 shows a schematic view of a packaging machine 1 with two work stations 3, 4, for example, a sealing station 3 and a cutting station 4, a transport chain 5 comprising chain clips 7 for transporting material blanks 9 along a direction of transport T. Transport chain 5 is mounted on a chain deflection pulley 11 and can also be driven by the latter. Arranged in the region of a planar, preferably horizontal, section H of transport chain 5 is a chain opening mechanism 13 which opens or maintains open chain clips 7, so that material blank 9 can be introduced thereinto. Chain opening mechanism 13 can be changed from an opening state A to a closing state B and vice versa by way of a drive 15, thereby opening and closing chain clips 7. When chain clips 7 open, an upper part 17 and a lower part 19 of chain clips 7 are each slid and/or pivoted relative to one another, where one or both parts 17, 19 can execute a motion. Arranged in the region of chain deflection pulley 11 is a run-on contour 21 which in this embodiment ensures that chain clips 7 are already opened in the region of an upper half C of chain deflection pulley 11. Run-on contour 21 typically takes charge of opening the chain clips 7 up to an upper vertex S of the chain deflection pulley 11 and chain opening mechanism 13 of opening chain clips 7 in the downstream planar section H. Adjoining planar section H downstream is an insertion region E in which products are placed onto or into the product supports or packaging bases.

The product supports or packaging bases in the form of material blanks 9 are secured in insertion region E in closed chain clips 7.

Figure 2:
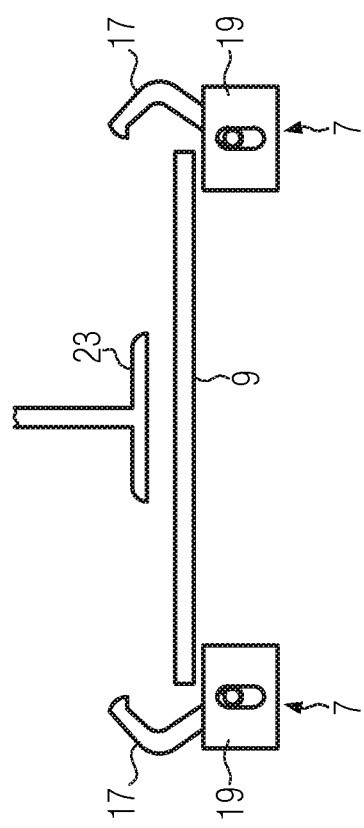
FIG. 2 is a schematic section view of one embodiment of a packaging machine in accordance with the teachings of the present disclosure showing a material blank between two open chain clips.

FIG. 2 shows a schematic view of a material blank 9 in two open chain clips 7 arranged on both sides of direction of transport T. Chain clips 7 are opened by pivoting upper parts 17 upwardly and to the side. In this embodiment, material blank 9 can be pushed in along the direction of transport T, but also be placed in from above by way of suction gripper 23. By simultaneously depositing a horizontally oriented material blank 9, it can be placed into chain clips 7 arranged on both sides. However, material blank 9 can also be placed in at an angle first into chain clips 7 on one side and then be folded down into chain clips 7 on the other side.

Figure 3:
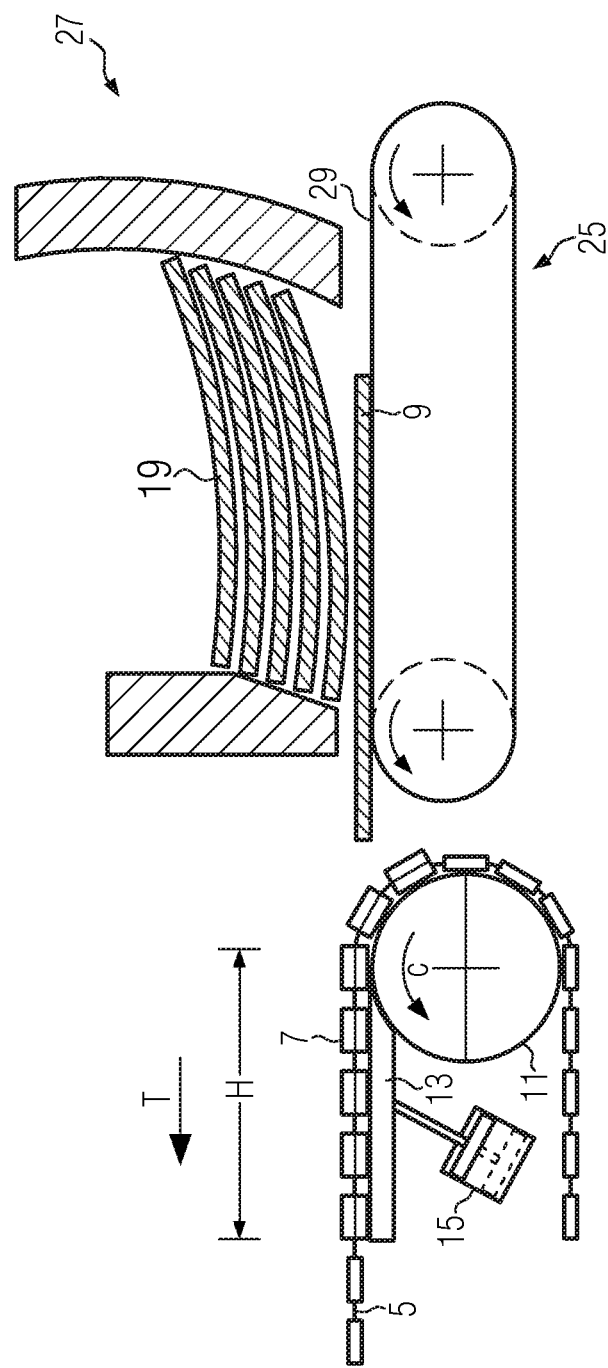
FIG. 3 is a schematic section view of one embodiment of an advancing device of a packaging machine in accordance with the teachings of the present disclosure.

FIG. 3 shows a schematic view of a variant of an advancing device 25 which pushes material blanks 9 from a destacker 27 into open chain clips 7 in direction of transport T by way of a conveyor 29, for example, a conveyor belt. In this case, chain clips 7 are open in upper half C of chain deflection pulley 11 as well as in planar section H so that material blank 9 can be pushed in an unobstructed manner into chain clips 7.

Figure 4:
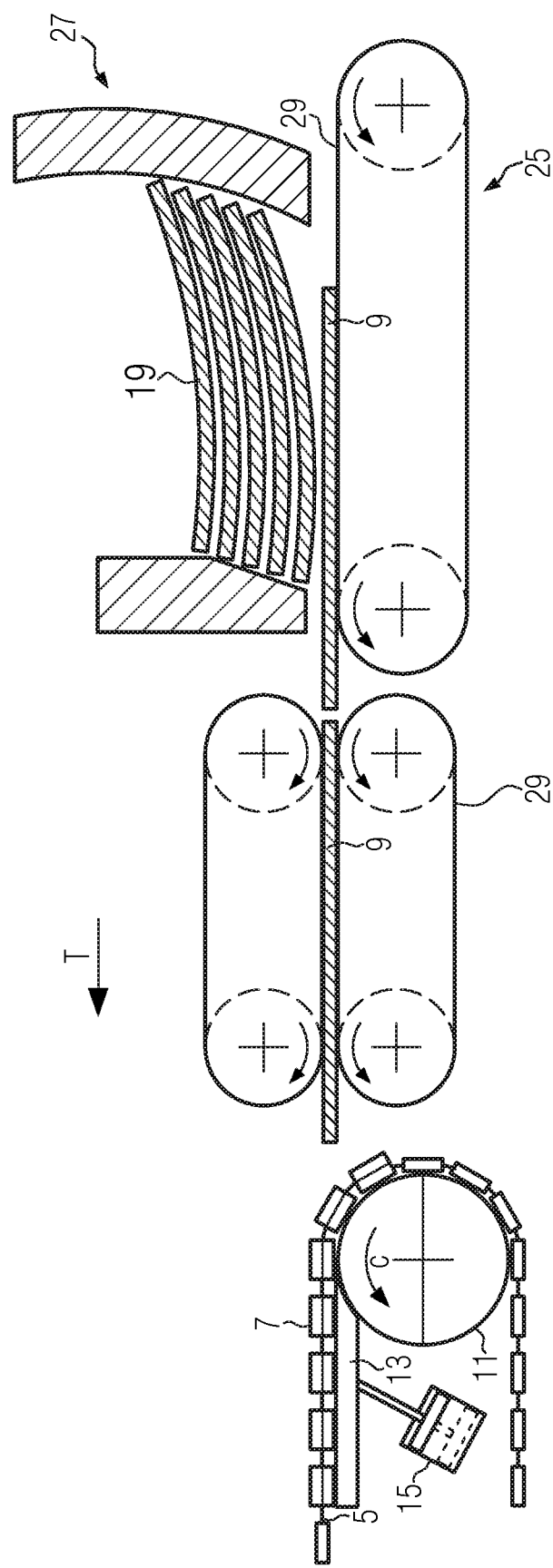
FIG. 4 is a schematic view of another embodiment of an advancing device of a packaging machine in accordance with the teachings of the present disclosure.

FIG. 4 shows a schematic view of a second variant of an advancing device 25 in which an additional conveyor 29 is present which moves material blank 9 in direction of transport T in a clamped manner between two conveyor belts. It is ensured in this variant that material blank 9 is transported onward with a well-defined force and speed.

Figure 5:
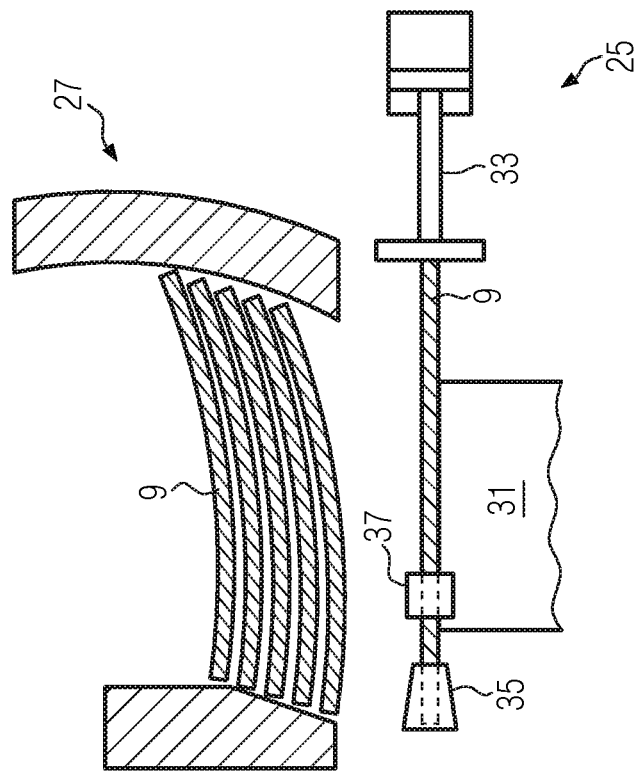
FIG. 5 is a schematic view of another embodiment of an advancing device of a packaging machine in accordance with the teachings of the present disclosure.
Figure 5:
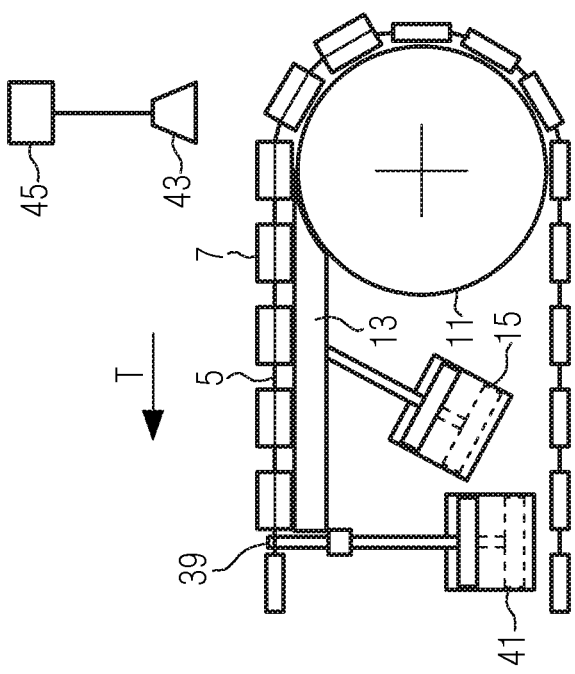

FIG. 5 shows a schematic view of a third variant of an advancing device 25 in which material blank 9 is deposited by destacker 27 on a support 31, and advancing device 25 is designed in the form of a pusher 33 which pushes material blank 9 into chain clips 7. For correct positioning transverse to direction of transport T, a guide element 35 and a further pusher 37, which can also be arranged as an alternative to one another, are provided on one or both sides. Furthermore, a height-adjustable stop 39 is shown with a drive 41 which enables correct positioning of material blank 9 along direction of transport T. In order to enable the transport of material blank 9 by transport chain 5, stop 39 is driven downwardly after successful positioning. A sensor 43 detects the position of material blank 9 and a control unit 45 can control the positioning of material blank 9 in dependence of the sensor data determined.

FIG. 6 shows a schematic view of an embodiment of a material blank 9 and a stop 39 for positioning material blank 9. Stop 39 has two centering contours 47 in the form of cylindrical pins which can be moved by drive 41 into the travel path of material blank 9. At a front edge 49, material blank 9 has two, e.g. triangular, centering recesses 51. When advancing device 25 pushes in material blank 9, centering contours 47 engage with centering recesses 51 such that material blank 9 is aligned both longitudinally and transverse to direction of transport T.

The mode of operation of packaging machine 1 shall be described in more detail below with reference to the figures.

A material blank 9 is separated from a supply, for example, a stack of material blanks 9 and fed to an advancing device 25, for example, by way of a destacker 27. Advancing device 25 then moves material blank 9 in direction of transport T into one or more open chain clips 7, which were previously opened by a chain opening mechanism 13 in a planar, preferably horizontal section H of transport chain 5. For this purpose, an active actuation of chain opening mechanism 13 takes place, which thereby changes from a closing state B to an opening state A and thus opens chain clips 7 in the planar oriented section H of transport chain 5.

When pushed in, material blank 9 can be actively aligned by one or more pushers 37 or passively by of one or more guide elements 35 transverse to direction of transport T. The position of material blank 9 along direction of transport T can be aligned by the control device of advancing device 25 and/or a stop 39. As an alternative to introducing material blank 9 into open chain clips 7 by way of an advancing device 25, material blank 9 can also be placed into chain clips 7 by a suction gripper 23. After introducing material blank 9 into chain clips 7, the latter are closed by chain opening mechanism 13 changing from the opening state A to the closing state B. Thereafter, material blank 9 is moved into insertion region E and to work station 3.

Starting out from the above-described embodiments of a packaging machine 1, many variations thereof are possible. It would be conceivable, for example, to arrange chain clips 7 in groups along transport chain 5, where spacings are present between the groups, so that no chain clips 7 are present along an upper portion C of chain deflection pulley 11 when material blank 9 is pushed into chain clips 7 of a planar section H of transport chain 5. It is then possible to dispense with a run-on contour 21 along chain deflection pulley 11, since no chain clips 7 would obstruct the horizontal motion of material blank 9.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention.

As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A packaging machine having one or more work stations, the packaging machine comprising:
    a transport chain for transporting a flat material blank to the one or more work stations;
    a chain deflection pulley on which the transport chain is mounted;
    wherein the transport chain comprises:
        a plurality of chain clips, each of the plurality of chain clips having an upper part and a lower part, wherein at least one of the upper part or the lower part is pivotable and/or slideable relative to the other so that each of the plurality of chain clips is moveable between an open position and a closed position;
    wherein the material blank is capable to be introduced into one or more of the plurality of chain clips when the one or more of the plurality of chain clips are each disposed in the open position and the material blank is securable in the one or more of the plurality of chain clips when the one or more of the plurality of chain clips are each disposed in the closed position so that the material blank can be moved by the transport chain in a direction of transport;
    wherein the packaging machine further comprises a run-on contour disposed along a section of the chain deflection pulley and configured to move at least one of the plurality of chain clips from the closed position to the open position, and wherein the run-on contour is disposed at one of a region of an upper half of the chain deflection pulley, or in a manner that a position of the run-on contour is adjustable so as to adjust a position along the chain deflection pulley in which the at least one of the plurality of chain clips may be moved from the closed position to the open position;
    wherein the packaging machine further comprises a chain opening mechanism configured to maintain the at least one of the plurality of chain clips in the open position when the at least one of the plurality of chain clips is disposed on a planar oriented section of the transport chain or actively move the at least one of the plurality of chain clips between the closed position and the open position when the at least one of the plurality of chain clips is disposed on the planar oriented section of the transport chain in order to reversibly open the at least one of the plurality of chain clips, so that the material blank can be introduced into the at least one of the plurality of chain clips.

2. The packaging machine according to claim 1, wherein the chain opening mechanism is configured to reversibly open the at least one of the plurality of chain clips when the at least one of the plurality of chain clips is disposed downstream of the chain deflection pulley.

3. The packaging machine according to claim 1, wherein the run-on contour is configured to ensure that the at least one of the plurality of chain clips is in the open position when the at least one of the plurality of chain clips is disposed proximate an upper vertex of the chain deflection pulley.

4. The packaging machine according to claim 1, wherein the run-on contour is configured to move at least another one of the plurality of chain clips from the closed position to the open position so that the at least another one of the plurality of chain clips is in the open position when the at least another one of the plurality of chain clips is disposed proximate an upper vertex of the chain deflection pulley, so that the material blank can be introduced into the at least one of the plurality of chain clips by passing through the at least another one of the plurality of chain clips when the at least one of the plurality of chain clips is disposed on the planar oriented section of the transport chain and the at least another one of the plurality of chain clips is disposed proximate the upper vertex of the chain deflection pulley.

5. The packaging machine according to claim 1, further comprising an advancing device which is configured to push the material blank into the one or more of the plurality of chain clips when the one or more of the plurality of chain clips are each disposed in the open position.

6. The packaging machine according to claim 5, further comprising a support configured to support the material blank and a destacker configured to deposit the material blank on the support, wherein the support is aligned with the one or more of the plurality of chain clips when the one or more of the plurality of chain clips are each disposed in the open position so that the material blank can be pushed into the one or more of the plurality of chain clips that are each disposed in the open position by the advancing device.

7. The packaging machine according to claim 1, further comprising at least one of a lateral guide element or a pusher configured to align the material blank transverse to the direction of transport.

8. The packaging machine according to claim 1, further comprising an adjustable stop that is variably positionable along the direction of transport, wherein the adjustable stop is configured to align the material blank along the direction of transport.

9. The packaging machine according to claim 8, wherein the adjustable stop is movable and disposed to be both extended into and retracted from a transport path of the material blank.

10. The packaging machine according to claim 9, wherein the stop is coupled to the chain opening mechanism.

11. The packaging machine according to claim 1, further comprising one or more sensors disposed to detect position and orientation of the material blank.

12. The packaging machine according to claim 1, further comprising a suction gripper configured to place the material blank into one or more of the plurality of chain clips that are disposed in the open position.

13. The packaging machine according to claim 1, wherein the chain opening mechanism is selectively deactivateable.

14. A method for operating a packaging machine, the method comprising:
moving at least one of a plurality of chain clips disposed on a transport chain from a closed position to an open position with a run-on contour associated with a chain deflection pulley on which the transport chain is mounted, wherein the run-on contour is disposed at one of an upper region of the chain deflection pulley, or in a manner that a position of the run-on contour is adjustable so as to adjust a position along the chain deflection pulley at which the at least one of the plurality of chain clips may be moved from the closed position to the open position;
actively actuating a chain opening mechanism to maintain the at least one of the plurality of chain clips in the open position when the at least one of the plurality of chain clips is disposed in a planar oriented section of the transport chain, or to move the at least one of the plurality of chain clips from the closed position to the open position when the at least one of the plurality of chain clips is disposed in the planar oriented section of the transport chain;
introducing a flat material blank into the at least one of the plurality of chain clips disposed in the open position;
moving the at least one of the plurality of chain clips from the open position to the closed position to secure the flat material blank;
transporting the flat material blank to a work station of the packaging machine.

15. The method according to claim 14, wherein the introducing comprises at least one of pushing the flat material blank into the at least one of the plurality of chain clips using an advancing device, or placing the flat material blank into the at least one of the plurality of chain clips using a suction gripper.

16. The method according to claim 14, wherein the run-on contour is configured to maintain the at least one of the plurality of chain clips in the open position when the at least one of the plurality of chain clips is disposed proximate an upper vertex of the chain deflection pulley.

17. The method according to claim 14, further comprising moving at least another one of the plurality of chain clips disposed on the transport chain from a closed position to an open position with the run-on contour so that the at least another one of the plurality of chain clips is in the open position when the at least another one of the plurality of chain clips is disposed proximate an upper vertex of the chain deflection pulley, and wherein the introducing comprises introducing the flat material blank into the at least one of the plurality of chain clips by passing through the at least another one of the plurality of chain clips when the at least one of the plurality of chain clips is disposed on the planar oriented section of the transport chain and the at least another one of the plurality of chain clips is disposed proximate the upper vertex of the chain deflection pulley.

* * * * *